(12) United States Patent
Tarkiainen et al.

(10) Patent No.: US 10,826,408 B2
(45) Date of Patent: Nov. 3, 2020

(54) POWER CONVERTER, AN ELECTRIC POWER SYSTEM, AND A METHOD FOR CONTROLLING AN ELECTRIC POWER SYSTEM

(71) Applicant: Danfoss Mobile Electrification Oy, Lappeenranta (FI)

(72) Inventors: Antti Tarkiainen, Lappeenranta (FI); Tero Järveläinen, Lappeenranta (FI)

(73) Assignee: Danfoss Mobile Electrification Oy, Lappeenranta (FI)

( * ) Notice: Subject to any disclaimer, the term of this patent is extended or adjusted under 35 U.S.C. 154(b) by 0 days.

(21) Appl. No.: 16/174,470

(22) Filed: Oct. 30, 2018

(65) Prior Publication Data

US 2019/0149065 A1    May 16, 2019

(30) Foreign Application Priority Data

Nov. 15, 2017   (EP) .................................... 17201763

(51) Int. Cl.
| | | |
|---|---|---|
| *H02P 1/00* | (2006.01) | |
| *H02P 1/28* | (2006.01) | |
| *H02P 3/00* | (2006.01) | |
| *H02P 7/06* | (2006.01) | |
| *H02M 7/5387* | (2007.01) | |
| *H02P 27/06* | (2006.01) | |
| *B60L 53/24* | (2019.01) | |

(Continued)

(52) U.S. Cl.
CPC ......... *H02M 7/53871* (2013.01); *B60L 53/24* (2019.02); *H02J 7/00* (2013.01); *H02P 27/06* (2013.01); *H02J 7/34* (2013.01); *H02J 7/35* (2013.01); *H02J 2207/20* (2020.01)

(58) Field of Classification Search
CPC ........................... H02M 7/52871; B60L 53/24
USPC .................................................. 318/504, 139
See application file for complete search history.

(56) References Cited

U.S. PATENT DOCUMENTS

| | | | | |
|---|---|---|---|---|
| 2004/0062059 A1* | 4/2004 | Cheng | ..................... | B60L 53/22 363/17 |
| 2013/0264975 A1* | 10/2013 | Kaita | ................... | B60L 15/2009 318/139 |
| 2017/0222442 A1* | 8/2017 | Katano | ................... | H02J 3/387 |

FOREIGN PATENT DOCUMENTS

| | | |
|---|---|---|
| CN | 101459344 A | 6/2009 |
| CN | 103078578 A | 5/2013 |

(Continued)

OTHER PUBLICATIONS

European Search Report for U.S. Appl. No. EP 17201763.4 dated Jun. 6, 2018.

*Primary Examiner* — Erick D Glass
(74) *Attorney, Agent, or Firm* — McCormick, Paulding & Huber PLLC

(57) ABSTRACT

A power converter for an electric power system comprises a switching circuit (102) for supplying, in a first operating mode of the power converter, voltages for driving a rotating electric machine. The power converter comprises a contactor system (110) and a controller (109) for using, in a second operating mode of the power converter, the switching circuit and at least one of windings (115) of the rotating electric machine as a voltage-decreasing direct voltage converter between direct voltage terminals of the power converter. Therefore, the switching circuit of the power converter can be utilized both for driving the rotating electric machine and, for example, for charging a battery element connected to a direct voltage terminal of the power converter.

20 Claims, 3 Drawing Sheets

(51) Int. Cl.
    *H02J 7/00*     (2006.01)
    *H02J 7/35*     (2006.01)
    *H02J 7/34*     (2006.01)

(56) References Cited

FOREIGN PATENT DOCUMENTS

| | | |
|---|---|---|
| CN | 103547474 A | 1/2014 |
| CN | 107000600 A | 8/2017 |
| DE | 4107391 A1 | 9/1992 |
| EP | 2711234 A1 | 3/2014 |
| JP | 2010045961 A | 2/2010 |
| WO | 2016091426 A1 | 6/2016 |
| WO | 2017041144 A1 | 3/2017 |

* cited by examiner

POWER CONVERTER, AN ELECTRIC POWER SYSTEM, AND A METHOD FOR CONTROLLING AN ELECTRIC POWER SYSTEM

CROSS-REFERENCE TO RELATED APPLICATION

This application claims foreign priority benefits under U.S.C. § 119 to European Patent Application No. EP17201763.4 filed on Nov. 15, 2017, the content of which is hereby incorporated by reference in its entirety.

TECHNICAL FIELD

The disclosure relates generally to control of electric energy. More particularly, the disclosure relates to a power converter for an electric power system, e.g. an electric power system of a vehicle. Furthermore, the disclosure relates to an electric power system, to a method for controlling an electric power system, and to a computer program for controlling an electric power system.

BACKGROUND

In many cases, an electric power system comprises one or more direct voltage energy sources, one or more rotating electric machines, and one or more power converters for converting direct voltages into forms suitable for the electric machines. Furthermore, the electric power system may comprise one or more direct voltage energy storages for storing energy and for responding to power needs which cannot be satisfied by the direct voltage energy sources. Each direct voltage energy source can be for example a fuel cell, a photovoltaic panel, or another suitable direct voltage energy source. Each direct voltage energy storage may comprise for example a battery system and/or a capacitor bank. The electric power system can be for example an electric power system of a ship in which case the rotating electric machines may comprise one or more propulsion motors and e.g. one or more bow thruster motors. The motors are advantageously alternating current "AC" motors and the corresponding power converters are inverters for converting direct voltages into alternating voltages suitable for the AC-motors.

In many electric power systems of the kind described above, there is a need to charge one or more direct voltage energy storages with the aid of one or more direct voltage energy sources. Thus, there is typically a need for one or more direct voltage converters for converting the direct voltages of the direct voltage energy sources into direct voltages suitable for charging the direct voltage energy storages. The direct voltage converters however increase the complexity and the costs of an electric power system.

SUMMARY

The following presents a simplified summary in order to provide a basic understanding of some aspects of various embodiments. The summary is not an extensive overview of the invention. It is neither intended to identify key or critical elements of the invention nor to delineate the scope of the invention. The following summary merely presents some concepts in a simplified form as a prelude to a more detailed description of exemplifying embodiments.

In accordance with the invention, there is provided a new power converter for an inductive load having one or more inductive windings. The inductive load can be e.g. a rotating electric machine. A power converter according to the invention comprises:

a switching circuit comprising direct voltage rails, a first direct voltage terminal for connecting the direct voltage rails to first direct voltage, a second direct voltage terminal for connecting the direct voltage rails to second direct voltage, a supply voltage terminal for connecting to the one or more inductive windings, first controllable switches between a first one of the direct voltage rails and the supply voltage terminal, and second controllable switches between a second one of the direct voltage rails and the supply voltage terminal, a controller for controlling, in a first operating mode of the power converter, the switching circuit to produce one or more controllable voltages on the supply voltage terminal, and a contactor system for disconnecting, in a second operating mode of the power converter, a pole of the second direct voltage terminal from the first one of the direct voltage rails and for connecting the pole of the second direct voltage terminal to at least one of the inductive windings.

The above-mentioned controller is configured to control, in the second operating mode, one or more of the first controllable switches to alternate between conductive and non-conductive states. Thus, the above-mentioned switching circuit and the at least one of the inductive windings can be operated as a voltage-decreasing direct voltage converter, i.e. a buck-converter, between the first and second direct voltage terminals of the power converter. Therefore, the above-mentioned switching circuit is usable for supplying electric energy to an inductive load, e.g. a rotating electric machine, as well as a direct voltage converter for e.g. charging a direct voltage energy storage with the aid of a direct voltage energy source when the direct voltage energy source is connected to the first direct voltage terminal and the direct voltage energy storage is connected to the second direct voltage terminal. Thus, a need for a separate direct voltage converter can be avoided.

In a power converter according to an exemplifying and non-limiting embodiment of the invention, the above-mentioned controller is configured to control, in a third operating mode, one or more of the second controllable switches to alternate between conductive and non-conductive states. Thus, the above-mentioned switching circuit and the at least one of the inductive windings can be operated as a voltage-increasing direct voltage converter, i.e. a boost-converter, for transferring electric energy from the second direct voltage terminal to the first direct voltage terminal.

In accordance with the invention, there is provided also a new electric power system that can be, for example but not necessarily, an electric power system of a ship or another vehicle. An electric power system according to the invention comprises:

a power converter according to the invention, and
a direct voltage energy source, e.g. a fuel cell, connected to the first direct voltage terminal of the power converter,
a direct voltage energy storage, e.g. a battery and/or capacitor system, connected to the second direct voltage terminal of the power converter, and
a rotating electric machine having one or more windings connected to the supply voltage terminal of the power converter.

In accordance with the invention, there is provided also a new method for controlling an electric power system of the kind described above. A method according to the invention comprises:
- controlling, in the first operating mode of the electric power system, the power converter to drive the rotating electric machine,
- controlling, in the second operating mode of the electric power system, the contactor system of the power converter to disconnect the pole of the second direct voltage terminal of the power converter from the first one of the direct voltage rails of the power converter and to connect the pole of the second direct voltage terminal to at least one of the windings of the rotating electric machine, and
- controlling, in the second operational mode, one or more of the first controllable switches of the power converter to alternate between conductive and non-conductive states so as to operate the switching circuit of the power converter and the at least one of the windings of the rotating electric machine as a voltage-decreasing direct voltage converter between the first and second direct voltage terminals of the power converter.

In accordance with the invention, there is provided also a new computer program for controlling an electric power system of the kind described above. A computer program according to the invention comprises computer executable instructions for controlling a programmable processing system to:
- control, in the first operating mode of the electric power system, the power converter to drive the rotating electric machine,
- control, in the second operating mode of the electric power system, the contactor system of the power converter to disconnect the pole of the second direct voltage terminal of the power converter from the first one of the direct voltage rails of the power converter and to connect the pole of the second direct voltage terminal to at least one of the windings of the rotating electric machine, and
- control, in the second operational mode, one or more of the first controllable switches of the power converter to alternate between conductive and non-conductive states so as to operate the switching circuit of the power converter and the at least one of the windings of the rotating electric machine as a voltage-decreasing direct voltage converter between the first and second direct voltage terminals of the power converter.

In accordance with the invention, there is provided also a new computer program product. The computer program product comprises a non-volatile computer readable medium, e.g. a compact disc "CD", encoded with a computer program according to the invention.

Various exemplifying and non-limiting embodiments are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

Exemplifying and non-limiting embodiments and their advantages are explained in greater detail below in the sense of examples and with reference to the accompanying drawings, in which.

DETAILED DESCRIPTION

The specific examples provided in the description given below should not be construed as limiting the scope and/or the applicability of the appended claims. Lists and groups of examples provided in the description given below are not exhaustive unless otherwise explicitly stated.

Figure 1:
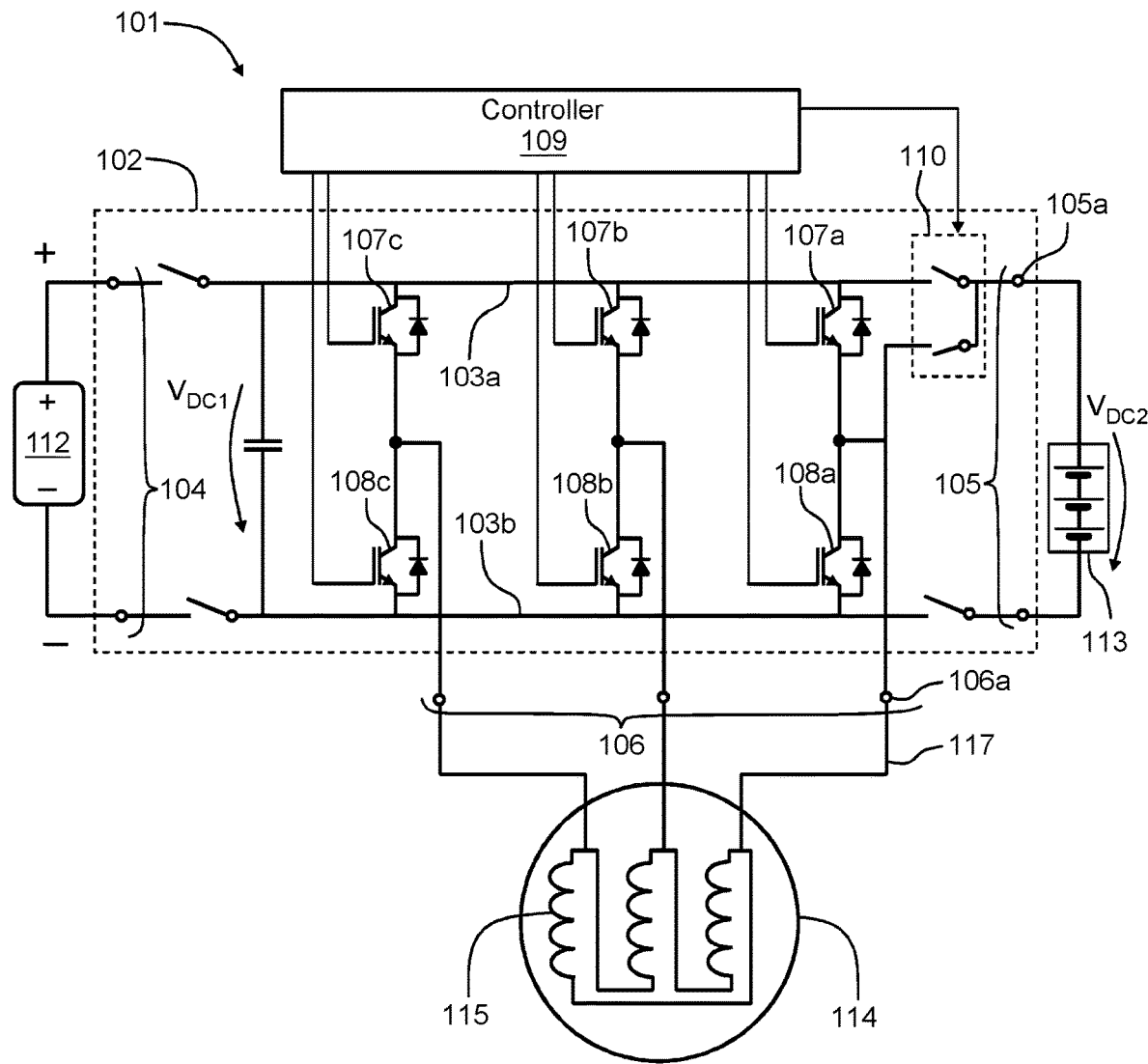
FIG. 1 shows a schematic illustration of an electric power system that comprises a power converter according to an exemplifying and non-limiting embodiment.

FIG. 1 shows a schematic illustration of an electric power system that comprises a power converter 101 according to an exemplifying and non-limiting embodiment of the invention. The electric power system comprises a direct voltage energy source 112 connected to a first direct voltage terminal 104 of the power converter 101. The direct voltage energy source 112 can be for example a fuel cell, a photovoltaic panel, or a rectifier which rectifies alternating voltage of a power distribution grid. The electric power system comprises a direct voltage energy storage 113 connected to a second direct voltage terminal 105 of the power converter 101. The direct voltage energy storage 113 may comprise for example a battery system and/or a capacitor bank. The electric power system comprises a rotating electric machine 114 having windings 115 connected to a supply voltage terminal 106 of the power converter. In this exemplifying case, the rotating electric machine 114 is a three-phase alternating current "AC" electric machine that can be e.g. an externally excited synchronous machine, a permanent magnet machine, an inductance machine, or a reluctance machine.

The power converter 101 comprises a switching circuit 102 that comprises the above-mentioned direct voltage terminals 104 and 105 and the supply voltage terminal 106. The switching circuit 102 further comprises direct voltage rails 103a and 103b, first controllable switches 107a, 107b, and 107c between the direct voltage rail 103a and the supply voltage terminal 106, and second controllable switches 108a, 108b, and 108c between the direct voltage rail 103b and the supply voltage terminal 106. The controllable switches 107a-107c and 108a-108c can be for example insulated gate bipolar transistors "IGBT", gate turn-off thyristors "GTO", metal oxide semiconductor field-effect transistors "MOSFET", or bipolar transistors. The power converter 101 comprises a controller 109 for controlling, in a first operating mode of the power converter, the switching circuit 102 to supply voltages to the rotating electric machine 114 so that the rotating electric machine operates in a desired way. The power converter 101 comprises a contactor system 110 for disconnecting, in a second operating mode of the power converter, a pole 105a of the direct voltage terminal 105 from the direct voltage rail 103a and for connecting the pole 105a of the direct voltage terminal 105 to the windings 115 of the rotating electric machine 114. In this exemplifying case, the windings 115 are arranged to constitute a delta-connected three-phase stator winding and the contactor system 110 is suitable for connecting the pole 105a of the direct voltage terminal 105 to a pole 106a of the supply voltage terminal 106. Thus, in this exemplifying case, the contactor system 110 is suitable for connecting the pole 105a to a phase conductor 117 of the three-phase stator winding.

The controller 109 is configured to control, in the second operating mode, the controllable switch 107b to alternate between conductive and non-conductive states and/or the controllable switch 107c to alternate between conductive and non-conductive states. Therefore, the switching circuit 102 and the windings 115 can be used as a voltage-decreasing direct voltage converter, i.e. as a buck-converter, between the direct voltage terminals 104 and 105 so that a diode of the controllable switch 108b and/or a diode of the controllable switch 108c operate as one or more free-wheeling diodes. Thus, the direct voltage energy storage 113 can be charged from the direct voltage energy source 112 so that $V_{DC1} > V_{DC2}$. In an exemplifying case where both of the controllable switches 107b and 107c are controlled to alternate between conductive and non-conductive states, the controller 109 is advantageously configured to operate the controllable switches 107b and 107c in a phase-shifted way so as to reduce ripple of direct current supplied to the direct voltage energy storage 113 via the direct voltage terminal 105.

In a power converter according to an exemplifying and non-limiting embodiment of the invention, the controller 109 is further configured to control, in a third operating mode, the controllable switch 108b to alternate between conductive and non-conductive states and/or the controllable switch 108c to alternate between conductive and non-conductive states. Therefore, the switching circuit 102 and the windings 115 can be used as a voltage-increasing direct voltage converter, i.e. as a boost-converter, between the direct voltage terminals 105 and 104 so that a diode of the controllable switch 107b and/or a diode of the controllable switch 107c operate as one or more free-wheeling diodes. Thus, electric energy can be transferred from the direct voltage energy storage 113 to the direct voltage energy source 112 so that $V_{DC1} > V_{DC2}$.

In the exemplifying power converter 101 illustrated in FIG. 1, the switching circuit 102 is an inverter-bridge for producing three-phase alternating voltage so as to drive the rotating electric machine 114. It is however also possible that, in an inverter-bridge of a power converter according to another embodiment of the invention, the number of phases is different from three. Furthermore, it is also possible that a switching circuit of a power converter according to an embodiment of the invention is configured to drive a direct current "DC" electric machine. In this exemplifying case, the switching circuit can be for example a full or half H-bridge.

In the exemplifying case illustrated in FIG. 1, the pole 105a having a positive polarity is disconnected from the direct voltage rail 103a and connected to the windings 115, and one or both of the controllable switches 107b and 107c are controlled to alternate between conductive and non-conductive states, and a diode or diodes of one or both of the controllable switches 108b and 108c operate as one or more free-wheeling diodes. It is, however, also possible that a pole of the direct voltage terminal 105 having a negative polarity is disconnected from the direct voltage rail 103b and connected to the windings 115, and one or both of the controllable switches 108b and 108c are controlled to alternate between conductive and non-conductive states, and a diode or diodes of one or both of the controllable switches 107b and 107c operate as one or more free-wheeling diodes.

Figure 2:
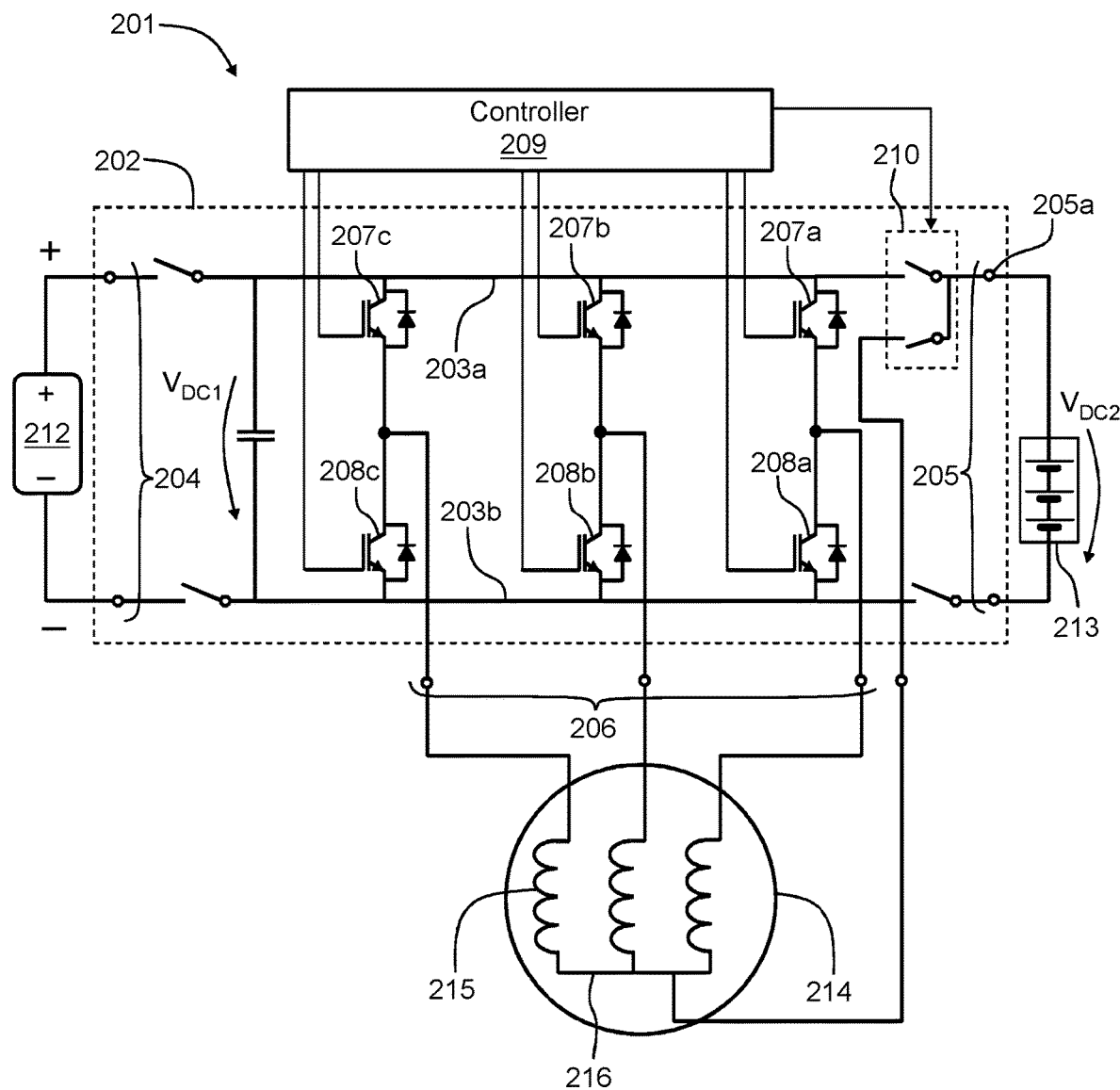
FIG. 2 shows a schematic illustration of an electric power system that comprises a power converter according to another exemplifying and non-limiting embodiment.

FIG. 2 shows a schematic illustration of an electric power system according to an exemplifying and non-limiting embodiment of the invention. The electric power system comprises a power converter 201, a direct voltage energy source 212, a direct voltage energy storage 213, and a rotating electric machine 214. The direct voltage energy source 212 is connected to a first direct voltage terminal 204 of the power converter 201, the direct voltage energy storage 213 is connected to a second direct voltage terminal 205 of the power converter 201, and windings 215 of the rotating electric machine 214 are connected to a supply voltage terminal 206 of the power converter 201. In this exemplifying case, the windings 215 of the rotating electric machine 214 are arranged to constitute a star-connected three-phase stator winding.

The power converter 201 comprises a switching circuit 202 that comprises the above-mentioned direct voltage terminals 204 and 205 and the supply voltage terminal 206. The switching circuit 202 further comprises direct voltage rails 203a and 203b, first controllable switches 207a, 207b, and 207c between the direct voltage rail 203a and the supply voltage terminal 206, and second controllable switches 208a, 208b, and 208c between the direct voltage rail 203b and the supply voltage terminal 206. The power converter 201 comprises a controller 209 for controlling, in a first operating mode of the power converter, the switching circuit 202 to supply voltages to the rotating electric machine 214 so that the rotating electric machine 214 operates in a desired way. The power converter 201 comprises a contactor system 210 for disconnecting, in a second operating mode of the power converter, a pole 205a of the direct voltage terminal 205 from the direct voltage rail 203a and for connecting the pole 205a of the direct voltage terminal 205 to the windings 215 of the rotating electric machine 214. In this exemplifying case, the contactor system 210 is suitable for connecting the pole 205a of the direct voltage terminal 205 to the star-point 216 of the three-phase stator winding of the rotating electric machine 214.

The controller 209 is configured to control, in the second operating mode, one or more of the controllable switches 207a-207c to alternate between conductive and non-conductive states. Therefore, the switching circuit 202 and the windings 215 can be used as a voltage-decreasing direct voltage converter, i.e. as a buck-converter, between the direct voltage terminals 204 and 205 so that a diode or diodes of one or more of the controllable switches 208a-208c operate as one or more free-wheeling diodes. Thus, the direct voltage energy storage 213 can be charged from the direct voltage energy source 212 so that $V_{DC1} > V_{DC2}$. The controllable switches 207a and/or 207b and/or 207c are operated advantageously so that electric currents flowing in phase-windings of the rotating electric machine 214 produce a net magnetic flux, i.e. so that magnetic fluxes generated by the electric currents flowing in the phase-windings do not cancel each other. This can be achieved for example so that only one or two of the controllable switches 207a, 207b, and 207c is/are controlled to alternate between conductive and non-conductive states.

The implementation of the controller 109 shown in FIG. 1, as well as the implementation of the controller 209 shown in FIG. 2, can be based on one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". Furthermore, the controller 109 as well as the controller 209 may comprise one or more memory devices such as e.g. random-access memory "RAM" circuits.

Figure 3:
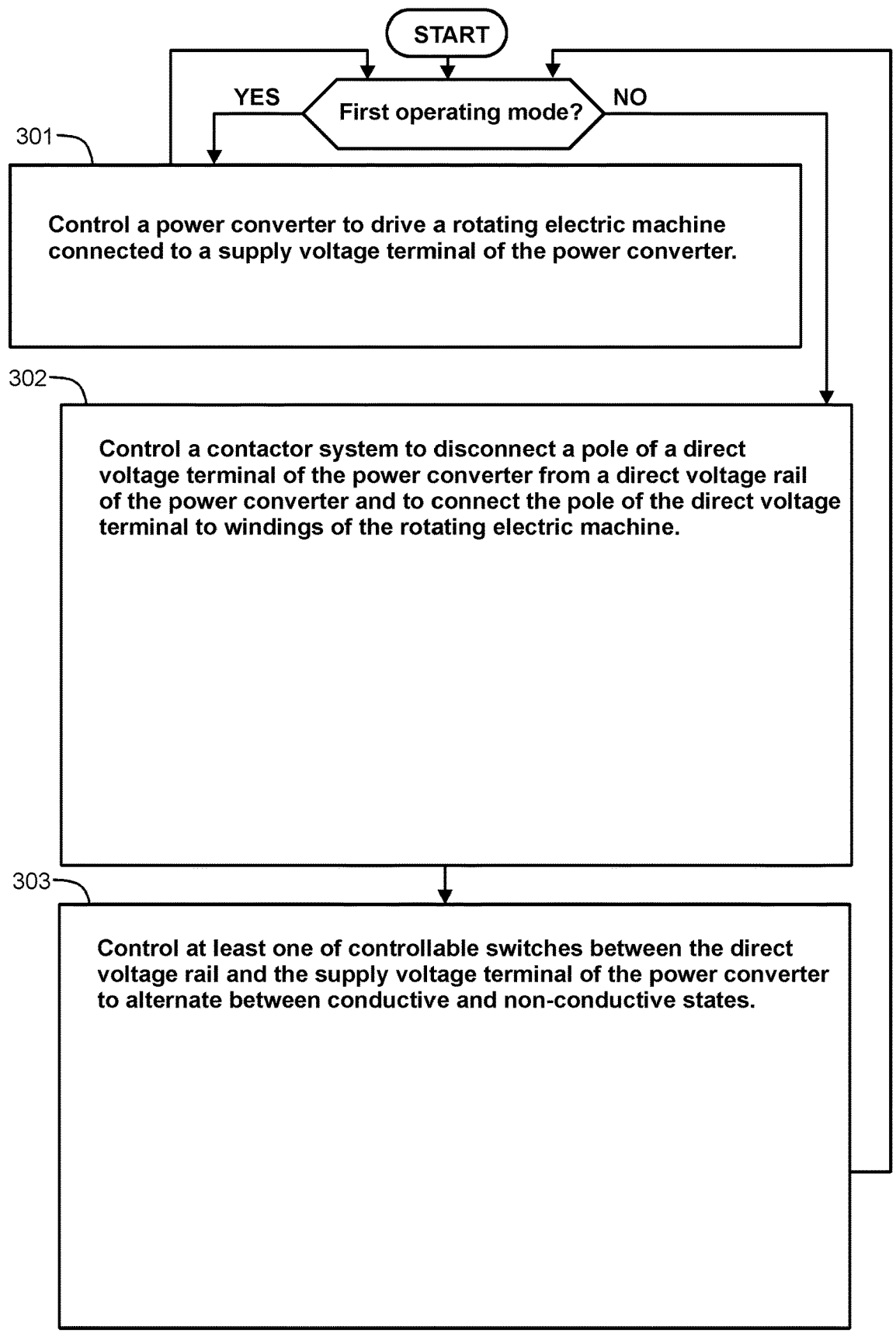
FIG. 3 shows a flowchart of a method according to an exemplifying and non-limiting embodiment of the invention for controlling an electric power system.

FIG. 3 shows a flowchart of a method according to an exemplifying and non-limiting embodiment of the invention for controlling an electric power system that comprises:
a rotating electric machine having one or more windings, and
a power converter comprising a switching circuit having direct voltage rails, a first direct voltage terminal for connecting the direct voltage rails to first direct voltage, a second direct voltage terminal for connecting the direct voltage rails to second direct voltage, a supply voltage terminal connected to the windings of the rotating electric machine, first controllable switches between a first one of the direct voltage rails and the supply voltage terminal, and second controllable switches between a second one of the direct voltage rails and the supply voltage terminal, The method comprises, in a first operational mode of the electric power system:
action 301: controlling the power converter to drive the rotating electric machine, The method comprises in a second operating mode of the electric power system:
action 302: controlling a contactor system to disconnect a pole of the second direct voltage terminal from the first one of the direct voltage rails and to connect the pole of the second direct voltage terminal to at least one of the windings of the rotating electric machine, and
action 303: controlling one or more of the first controllable switches to alternate between conductive and non-conductive states so as to operate the switching circuit and the at least one of the windings of the rotating electric machine as a voltage-decreasing direct voltage converter between the first and second direct voltage terminals of the power converter.

In a method according to an exemplifying and non-limiting embodiment of the invention, at least two of the first controllable switches are controlled to alternate between conductive and non-conductive states in the second operating mode.

In a method according to an exemplifying and non-limiting embodiment of the invention, the above-mentioned at least two of the first controllable switches are operated in a phase-shifted way so as to reduce ripple of direct current supplied via the second direct voltage terminal.

A computer program according to an exemplifying and non-limiting embodiment of the invention comprises computer executable instructions for controlling a programmable processing system to carry out actions related to a method according to any of the above-described exemplifying and non-limiting embodiments of the invention.

A computer program according to an exemplifying and non-limiting embodiment of the invention comprises software modules for controlling an electric power system of the kind described above. The software modules comprise computer executable instructions for controlling a programmable processing system to:
control, in a first operating mode of the electric power system, a power converter to drive a rotating electric machine,
control, in a second operating mode of the electric power system, a contactor system of the power converter to disconnect a pole of a direct voltage terminal of the power converter from a direct voltage rail of the power converter and to connect the pole of the direct voltage terminal to at least one of windings of the rotating electric machine, and
control, in the second operating mode, one or more of controllable switches of the power converter to alternate between conductive and non-conductive states so as to operate the power converter and the at least one of the windings of the rotating electric machine as a voltage-decreasing direct voltage converter between direct voltage terminals of the power converter.

The software modules can be for example subroutines or functions implemented with programming tools suitable for the programmable processing system.

A computer program product according to an exemplifying and non-limiting embodiment of the invention comprises a computer readable medium, e.g. a compact disc "CD", encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A power converter for an inductive load having one or more inductive windings, the power converter comprising:
a switching circuit comprising direct voltage rails, a first direct voltage terminal for connecting the direct voltage rails to first direct voltage, a second direct voltage terminal for connecting the direct voltage rails to second direct voltage, a supply voltage terminal for connecting to the one or more inductive windings, first controllable switches between a first one of the direct voltage rails and the supply voltage terminal, and second controllable switches between a second one of the direct voltage rails and the supply voltage terminal, and
a controller for controlling, in a first operating mode of the power converter, the switching circuit to produce one or more supply voltages on the supply voltage terminal, wherein the power converter further comprises a contactor system for disconnecting, in a second operating mode of the power converter, a pole of the second direct voltage terminal from the first one of the direct voltage rails and for connecting the pole of the second direct voltage terminal to at least one of the inductive windings and the supply voltage terminal, wherein the controller is configured to control, in the second operating mode, one or more of the first controllable switches to alternate between conductive and non-conductive states so as to operate the switching circuit and the at least one of the inductive windings as a voltage-decreasing direct voltage converter between the first and second direct voltage terminals.

2. The power converter according to claim 1, wherein the controller is configured to control, in the second operating mode, two or more of the first controllable switches to alternate between conductive and non-conductive states.

3. The power converter according to claim 2, wherein the controller is configured to operate, in the second operating mode, the two or more of the first controllable switches in a phase-shifted way so as to reduce ripple of direct current supplied via the second direct voltage terminal.

4. The power converter according to claim 1, wherein the contactor system is configured to connect, in the second operating mode, one pole of the supply voltage terminal to the pole of the second direct voltage terminal.

5. The power converter according to claim 1, wherein the switching circuit is an inverter-bridge.

6. The power converter according to claim 1, wherein the controller is configured to control, in a third operating mode of the power converter, one or more of the second controllable switches to alternate between conductive and non-conductive states so as to operate the switching circuit and the at least one of the inductive windings as a voltage-increasing direct voltage converter for transferring electric energy from the second direct voltage terminal to the first direct voltage terminal.

7. An electric power system comprising:
   a power converter according to claim 1,
   a direct voltage energy source connected to the first direct voltage terminal of the power converter,
   a direct voltage energy storage connected to the second direct voltage terminal of the power converter, and
   a rotating electric machine having one or more windings connected to the supply voltage terminal of the power converter.

8. The electric power system according to claim 7, wherein the power converter, and the windings of the rotating electric machine are arranged to constitute a multiphase stator winding.

9. The electric power system according to claim 8, wherein the multiphase stator winding is a star connected winding and the contactor system of the power converter is configured to connect, in the second operating mode of the power converter, the pole of the second direct voltage terminal of the power converter to a star-point of the star connected winding.

10. The electric power system according to claim 8, wherein the contactor system of the power converter is configured to connect, in the second operating mode of the power converter, the pole of the second direct voltage terminal of the power converter to a phase conductor of the multiphase stator windings.

11. A method for controlling an electric power system that comprises:
   a rotating electric machine having one or more windings, and
   a power converter comprising a switching circuit having direct voltage rails, a first direct voltage terminal for connecting the direct voltage rails to first direct voltage, a second direct voltage terminal for connecting the direct voltage rails to second direct voltage, a supply voltage terminal connected to the windings of the rotating electric machine, first controllable switches between a first one of the direct voltage rails and the supply voltage terminal, and second controllable switches between a second one of the direct voltage rails and the supply voltage terminal,
the method comprising, in a first operating mode of the electric power system, controlling the power converter to drive the rotating electric machine, wherein the method comprises in a second operating mode of the electric power system:
   controlling a contactor system to disconnect a pole of the second direct voltage terminal from the first one of the direct voltage rails and to connect the pole of the second direct voltage terminal to at least one of the windings of the rotating electric machine, and
   controlling one or more of the first controllable switches to alternate between conductive and non-conductive states so as to operate the switching circuit and the at least one of the windings of the rotating electric machine as a voltage-decreasing direct voltage converter between the first and second direct voltage terminals.

12. The method according to claim 11, wherein two or more of the first controllable switches are controlled to alternate between conductive and non-conductive states in the second operating mode.

13. The method according to claim 12, wherein the two or more of the first controllable switches are operated in a phase-shifted way so as to reduce ripple of direct current supplied via the second direct voltage terminal.

14. A computer program for controlling an electric power system that comprises:
   a rotating electric machine having one or more windings, and
   a power converter comprising a switching circuit having direct voltage rails, a first direct voltage terminal for connecting the direct voltage rails to first direct voltage, a second direct voltage terminal for connecting the direct voltage rails to second direct voltage, a supply voltage terminal connected to the windings of the rotating electric machine, first controllable switches between a first one of the direct voltage rails and the supply voltage terminal, and second controllable switches between a second one of the direct voltage rails and the supply voltage terminal,
the computer program comprising computer executable instructions for controlling, in a first operating mode of the electric power system, a programmable processing system to control the power converter to drive the rotating electric machine, wherein the computer program further comprises computer executable instructions for controlling, in a second operating mode of the electric power system, the programmable processing system to:
   control a contactor system to disconnect a pole of the second direct voltage terminal from the first one of the direct voltage rails and to connect the pole of the second direct voltage terminal to at least one of the windings of the rotating electric machine, and
   control one or more of the first controllable switches to alternate between conductive and non-conductive states so as to operate the switching circuit and the at least one of the windings of the rotating electric machine as a voltage-decreasing direct voltage converter between the first and second direct voltage terminals.

15. A computer program product comprising a non-transitory computer readable medium encoded with a computer program according to claim 14.

16. The power converter according to claim 2, wherein the contactor system is configured to connect, in the second operating mode, one pole of the supply voltage terminal to the pole of the second direct voltage terminal.

17. The power converter according to claim 3, wherein the contactor system is configured to connect, in the second operating mode, one pole of the supply voltage terminal to the pole of the second direct voltage terminal.

18. The power converter according to claim 2, wherein the switching circuit is an inverter-bridge.

19. The power converter according to claim 3, wherein the switching circuit is an inverter-bridge.

20. The power converter according to claim 4, wherein the switching circuit is an inverter-bridge.

\* \* \* \* \*